(12) United States Patent
Azzam et al.

(10) Patent No.: US 11,854,012 B2
(45) Date of Patent: *Dec. 26, 2023

(54) SYSTEMS AND METHODS FOR USE IN APPROVING TRANSACTIONS, BASED ON BIOMETRIC DATA

(71) Applicant: MASTERCARD INTERNATIONAL INCORPORATED, Purchase, NY (US)

(72) Inventors: Mark Jules Azzam, Ballwin, MO (US); John Eric Roberts, Sullivan, MO (US); Matthew Wease, O'Fallon, MO (US); Brett Jon Halkett, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,767

(22) Filed: May 26, 2022

(65) Prior Publication Data

US 2022/0284440 A1 Sep. 8, 2022

Related U.S. Application Data

(63) Continuation of application No. 16/997,708, filed on Aug. 19, 2020, now Pat. No. 11,348,109, which is a continuation of application No. 15/180,633, filed on Jun. 13, 2016, now Pat. No. 10,769,634.

(51) Int. Cl.
| | |
|---|---|
| G06Q 20/40 | (2012.01) |
| G06Q 20/20 | (2012.01) |
| G07F 7/08 | (2006.01) |

(52) U.S. Cl.
CPC ..... *G06Q 20/40145* (2013.01); *G06Q 20/204* (2013.01); *G06Q 20/4016* (2013.01); *G07F 7/0833* (2013.01)

(58) Field of Classification Search
CPC .......... G06Q 20/40145; G06Q 20/204; G06Q 20/4016
USPC ............................................................ 705/44
See application file for complete search history.

(56) References Cited

U.S. PATENT DOCUMENTS

| | | | | |
|---|---|---|---|---|
| 6,871,287 B1* | 3/2005 | Ellingson | ........... | G06Q 20/4012 |
| | | | | 705/72 |
| 7,431,207 B1* | 10/2008 | Neemann | ............... | G06Q 20/10 |
| | | | | 235/382 |
| 2002/0147600 A1* | 10/2002 | Waters | ................... | G06Q 20/10 |
| | | | | 705/39 |

(Continued)

*Primary Examiner* — Robert R Niquette
(74) *Attorney, Agent, or Firm* — Harness, Dickey & Pierce, P.L.C.

(57) ABSTRACT

Systems and methods are provided for use in processing transactions based on biometric data used in connection with authenticating consumers to payment accounts to which the transactions are directed. One exemplary method includes prompting a consumer to provide a biometric in connection with a transaction by the consumer, and receiving a payment account credential specific to a payment account for use in the transaction. The method also includes appending a biometric score and an indication of a biometric technology used to capture the biometric to an authorization request associated with the transaction, and transmitting, by the computing device, the authorization request to an issuer.

17 Claims, 3 Drawing Sheets

(56) References Cited

U.S. PATENT DOCUMENTS

| | | | |
|---|---|---|---|
| 2005/0097037 A1* | 5/2005 | Tibor | G06V 40/30 |
| | | | 705/64 |
| 2005/0125339 A1* | 6/2005 | Tidwell | G06Q 20/042 |
| | | | 705/1.1 |
| 2010/0161488 A1* | 6/2010 | Evans | G06Q 20/20 |
| | | | 340/5.82 |
| 2011/0238510 A1* | 9/2011 | Rowen | G06V 40/382 |
| | | | 705/16 |
| 2014/0214670 A1* | 7/2014 | McKenna | G06Q 20/4014 |
| | | | 705/44 |
| 2016/0048670 A1* | 2/2016 | Kim | G06V 40/1353 |
| | | | 382/125 |
| 2017/0109754 A1* | 4/2017 | Hanna | G06V 40/1347 |
| 2017/0171195 A1* | 6/2017 | Chang | G06F 21/32 |
| 2017/0357981 A1 | 12/2017 | Azzam et al. | |
| 2018/0211022 A1* | 7/2018 | Wagner | G06Q 20/40145 |
| 2019/0213311 A1* | 7/2019 | Tussy | G06V 10/17 |
| 2020/0380527 A1 | 12/2020 | Azzam et al. | |

\* cited by examiner

SYSTEMS AND METHODS FOR USE IN APPROVING TRANSACTIONS, BASED ON BIOMETRIC DATA

CROSS-REFERENCE TO RELATED APPLICATIONS

This application is a continuation of U.S. patent application Ser. No. 16/997,708 filed Aug. 19, 2020, which is a continuation of U.S. patent application Ser. No. 15/180,633 filed Jun. 13, 2016 (now U.S. Pat. No. 10,769,634). The entire disclosure of each of the above applications is incorporated herein by reference.

FIELD

The present disclosure generally relates to systems and methods for use in approving transactions based on biometric data, and in particular, to appending biometric scores to authorization requests indicative of degree of matching between scanned biometric data and reference biometric data used in connection with initially authenticating the transactions to payment accounts, where subsequent approval (or authorization) of the transactions is then, at least partly, based on the biometric scores.

BACKGROUND

This section provides background information related to the present disclosure which is not necessarily prior art.

Consumers often use payment accounts to purchase products (e.g., good and services, etc.) from merchants. The payment accounts may operate on credit, or may be based on funds previously deposited to the payment accounts. In either case, when using such payment accounts to make purchases, or otherwise, the consumers associated with the payment accounts are often authenticated through signature, personal identification number (PIN), or otherwise. In addition, it is known to authenticate consumers, for example, by matching thumb prints of the consumers to reference thumbprints. Then, once authenticated, regardless of the manner, the purchase transactions to the payment accounts are permitted to proceed, with payment networks and/or issuers of the payment accounts approving and/or declining the transactions. The purchase transactions may be declined, for example, when insufficient funds/credit are associated with the payment accounts, when payment devices associated with the payment accounts have been reported missing/stolen, or based on one or more parameters of the purchase transactions themselves (e.g., location, transaction amount, etc.).

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment accounts are often employed by consumers to fund purchase transactions for products (e.g., goods and/or services, etc.) at merchants. Typically, the consumers authenticate themselves when initiating such purchase transactions to the payment accounts by, for example, photo identification, signature, personal identification number (PIN), biometric, etc., whereby the merchants and/or issuers involved in the transactions gain confidence that the consumers are indeed authorized to use the given payment accounts (and associated payment devices). Separately, purchase transactions may be subjected to one or more fraud detection mechanisms, prior to approval of the transactions, where the mechanisms rely on, for example, locations of the transactions, purchasing patterns of the consumers involved in the transactions, purchase amounts of the transactions, etc.

Uniquely, the systems and methods herein incorporate data relating to authentication of consumers (received in connection with initiating purchase transactions) into fraud detection mechanisms used to evaluate the transactions for approval. In particular, when a purchase transaction is initiated, a consumer may permit his/her biometric to be captured (e.g., a fingerprint, a facial image, etc.) in order to authenticate the consumer to a payment account used in the transaction. In connection with such authentication, the captured biometric is compared to a reference biometric to determine a degree of matching, i.e., as a biometric score. In the systems and methods herein, the biometric score is appended to an authorization request for the purchase transaction, which is transmitted (in response to the transaction) to an issuer of the payment account (via a payment network, etc.). The issuer (or potentially, the payment network or another entity) can then determine whether the transaction should be approved, or not, based at least in part on the biometric score. In this manner, additional fraud detection and analysis of the purchase transaction is provided, during authorization of the transaction, based on biometric data for the consumer effecting the transaction, thereby giving a more complete picture of the underlying transaction to the issuer (or potentially, the payment network or another entity) upon which to determine if the circumstances of the transaction are sufficiently valid to approve the transaction or sufficiently suspicious to decline the transaction.

Figure 1:
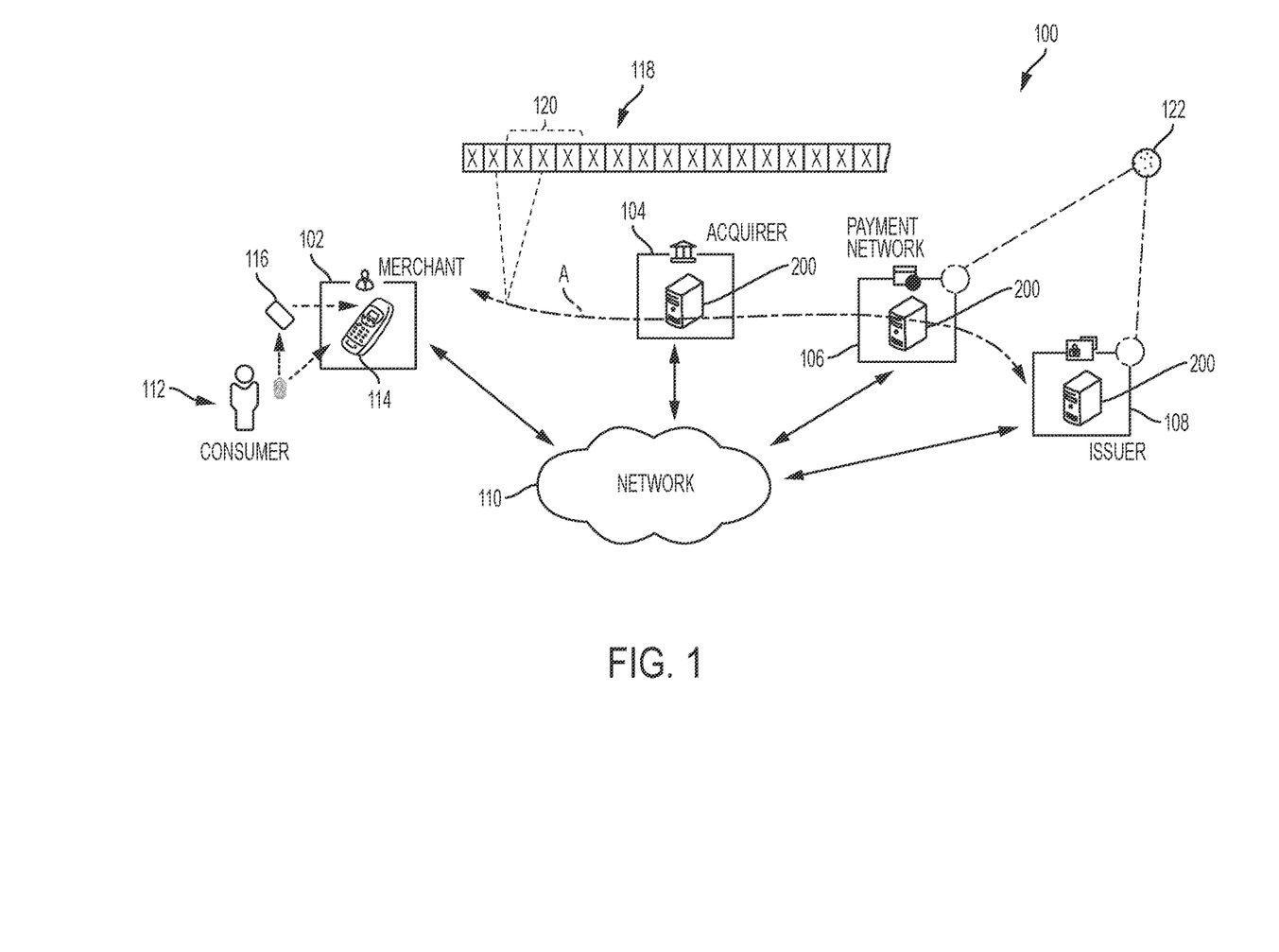
FIG. 1 is a block diagram of an exemplary system of the present disclosure suitable for use in authenticating consumers based on biometric data, in connection with purchase transactions by the consumers, and then approving the purchase transactions based at least in part on biometric scores associated with the biometric data.

FIG. 1 illustrates an exemplary system 100, in which the one or more aspects of the present disclosure may be implemented. Although the system 100 is presented in one arrangement, other embodiments may include systems arranged otherwise depending, for example, on the manner of processing purchase transactions to payment accounts, the use of biometrics (and the particular biometrics used) in authenticating consumers in connection with purchase transactions, etc.

The system 100 generally includes a merchant 102, an acquirer 104, a payment network 106, and an issuer 108, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, the network 110 may include multiple different networks, such as a private payment transaction network made accessible by the payment network 106 to the acquirer 104 and the issuer 108 and, separately, the public Internet, which is accessible as desired to the merchant 102, the acquirer 104, the issuer 108, and consumer 112.

The merchant 102 is generally associated with products (e.g., goods and/or services, etc.) provided for purchase by one or more consumers (e.g., the consumer 112, etc.). In the illustrated embodiment, the merchant 102 includes a point-of-sale (POS) terminal 114 that can be used in connection with effecting purchase transactions for the products, for example, by the consumer 112.

The consumer 112 is associated with a payment account provided by the issuer 108, through which the consumer 112 is able to fund purchase transactions for products (e.g., at the merchant 102, etc.). The payment account is associated with a payment device 116, which may include, for example, a credit card, a debit card, a fob, a token, an electronic wallet (or e-wallet) application installed and active in a communication device, or other suitable device for providing payment credentials, as described herein, etc. Further, in this exemplary embodiment, the payment device 116 is configured to participate in, or require, biometric authentication of the consumer 112 in connection with using the payment device 116 for a purchase transaction. More specifically, the illustrated payment device 116 includes at least a reference biometric of the consumer 112. In addition, the payment device 116 may include a reader suitable to capture a biometric from the consumer 112, and logic sufficient to compare the captured biometric to the reference biometric. Alternatively, such biometric reader and/or logic may be omitted from the payment device 116, whereby the biometric authentication relies on the POS terminal 114 at the merchant 102, for example, to capture a biometric from the consumer 112 and compare the captured biometric to a reference biometric stored on the payment device 116. In either case, the biometric may include any suitable biometric such as, without limitation, a fingerprint, a retina image, a voice record, or other attribute of the consumer 112 that may be captured and that is substantially unique to the consumer 112. The reference biometric may be captured for the consumer 112 and stored at the payment device 116 in any desired manner and at any desired time. For example, the reference biometric may be captured by the payment device 116, either via a reader at the payment device 116 or via a reader at the POS terminal 114, and then stored at the payment device 116. What's more, the reference biometric may be captured and stored at the payment device 116 upon registration by the consumer 112 for the payment account associated with the payment device 116, upon activation of the payment device 116 by the consumer 112, during a first use of the payment device 116 by the consumer 112, etc.

Figure 2:
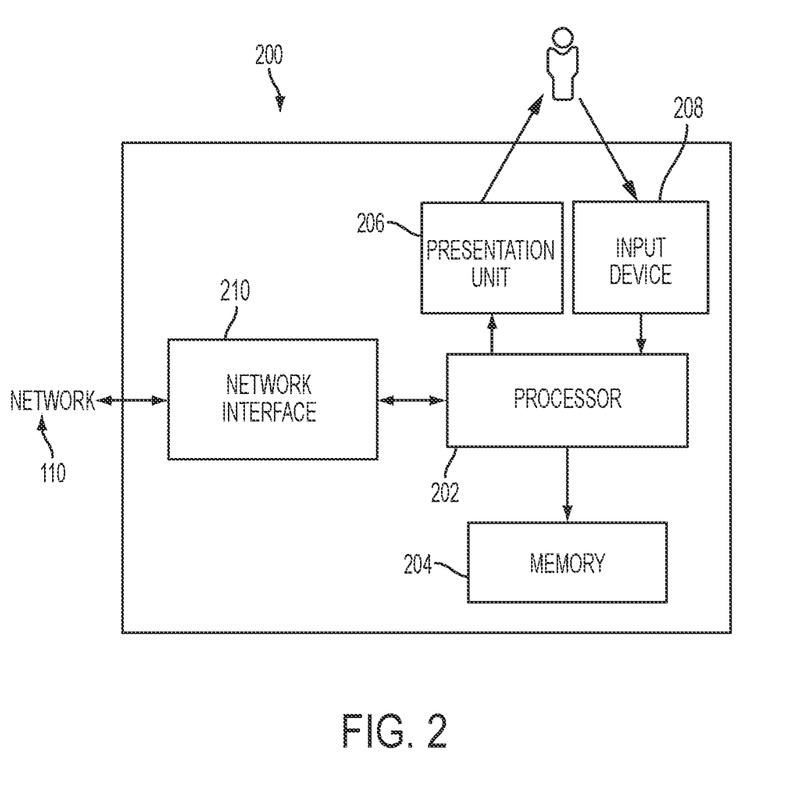
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, POS terminals, etc. In addition, the computing device 200 may include a single computing device, or it may include multiple computing devices located in close proximity or distributed over a geographic region, so long as the computing devices are specifically configured to function as described herein. However, the system 100 should not be considered to be limited to the computing device 200, as described below, as different computing devices and/or arrangements of computing devices may be used. In addition, different components and/or arrangements of components may be used in other computing devices.

In the system 100 of FIG. 1, each of the acquirer 104, the payment network 106, and the issuer 108 are illustrated as including, or being implemented in, a computing device 200, coupled to (and in communication with) the network 110. In addition, the POS terminal 114 of the merchant 102 is also consistent with the computing device 200. Further, in various embodiments, the payment device 116 associated with the consumer 112 may include (or be consistent with) the computing device 200.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc. to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable storage media. The memory 204 may be configured to store, without limitation, transaction data, reference biometrics, captured biometrics, biometric scores, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the operations or processes described herein.

In the exemplary embodiment, the computing device 200 includes a presentation unit 206 that is coupled to (and is in communication with) the processor 202 (however, it should be appreciated that the computing device 200 could include output devices other than the presentation unit 206, etc.). The presentation unit 206 outputs information (e.g., indications of transactions being approved/declined, transaction data associated with transactions, etc.), either visually or audibly to a user of the computing device 200, for example, the consumer 112 in the system 100 (e.g., at the POS terminal 114, etc.), etc. Various interfaces (e.g., as defined by network-based applications, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs from the user (i.e., user inputs) such as, for example, selections of authentication options, etc., or inputs from other computing devices. The input device 208 is coupled to (and is in communication with) the processor 202 and may include, for example, a keyboard, a pointing device, a mouse, a stylus, a biometric reader (e.g., a fingerprint scanner, a retina scanner, a voice recognition reader, etc.), a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, including the network 110. Further, in some exemplary embodiments, the computing device 200 includes the processor 202 and one or more network interfaces incorporated into or with the processor 202.

Referring again to FIG. 1, in the system 100, when the consumer 112 determines to initiate a purchase transaction at the merchant 102, for example, the consumer 112 presents the payment device 116 to the merchant 102. In particular, the consumer 112 may insert the payment device 116 into the POS terminal 114 (e.g., in the case where the payment device 116 is an EMV payment device, etc.), or the consumer 112 may position the payment device 116 proximate to or in contact with the POS terminal 114. At that time, the consumer 114 provides a biometric to the payment device 116 and/or the POS terminal 114, for comparison to the reference biometric at the payment device 116. In so doing, a degree of matching between the captured biometric and the reference biometric is determined (e.g., via instructions at the POS terminal 114, at the payment device 116, etc.). For example, the POS terminal 114 and/or the payment device 116 may generate a biometric score, representative of the degree of matching of the biometrics (using suitable algorithms, etc.), and compare the biometric score to a predefined threshold (e.g., based on historical data, etc.). Authentication of the consumer 112, based on the comparison (e.g., based on the degree of matching, based on the biometric score, etc.), is then determined to be successful or failed. When failed, the transaction is terminated and/or the biometric is recaptured for a subsequent comparison. If the authentication is successful, the purchase transaction continues, as described below.

Once the consumer 12 is authenticated (or prior to authenticating the consumer 112 or while authenticating the consumer 112), the POS terminal 114 reads the payment device 116 and captures payment account data/credentials for the consumer's payment account (e.g., a primary account number (PAN), a token, a name of the consumer 112, a CVV code for the payment device 116, an expiration date of the payment device 116, etc.). In turn, the POS terminal 114 compiles an authorization request 118 for the purchase transaction (including appending various transaction data for the purchase transaction thereto). In doing so, the POS terminal 114 generally indicates, by the authorization request 118, that the biometric authentication of the consumer 112 was performed. In the system 100, though, the POS terminal 114 further includes a biometric score in the authorization request 118 (e.g., in one or more data element (s) 120 in FIG. 1, etc.), representative of the degree of match between the biometric captured from the consumer 112 and the reference biometric.

As an example, the authorization request 118 may include a message consistent with the ISO 8583 standard, such as a 0100 message (e.g., a request from the POS terminal 114 for authorization of the purchase transaction by the consumer 112), a 0200 message (e.g., a request for funds, typically from an ATM or from the POS terminal 114 using a PIN), or other suitable message. Transaction data for the purchase transaction is included in various data elements of the message. Further, the biometric score is included in a specific data element in the message (e.g., in data element 48, in data element 55, etc.). It should be appreciated that the biometric score may be included in any available data element in the message associated with the authentication request 118, or constituent thereof, (whether the message is consistent with the ISO 8583 standard or not).

After the authorization request 118 is compiled, the merchant 102 (and particularly the POS terminal 114) initially communicates it to the acquirer 104, who in turn communicates the authorization request 118 (or a form thereof) to the issuer 108 through the payment network 106 (e.g., MasterCard®, VISA®, Discover®, American Express®, etc.), as indicated by path A in FIG. 1, to determine whether the payment account is in good standing and whether there is sufficient credit or funds to complete the transaction. If the issuer 108 accepts the transaction, a reply authorizing the transaction (e.g., as an ISO 8583 message, etc.) is provided back to the acquirer 104 and the merchant 102, thereby permitting the merchant 102 to complete the transaction. The transaction is later cleared and/or settled by and between the merchant 102 and the acquirer 104 (via an agreement between the merchant 102 and the acquirer 104) and by and between the acquirer 104 and the issuer 108 (via an agreement between the acquirer 104 and the issuer 108), via further communications (e.g., along path A in the system 100, etc.). However, if the issuer 108 declines the transaction, a reply declining the transaction is provided back to the merchant 102 along path A, thereby permitting the merchant 102 to stop the transaction.

In various exemplary embodiments, consumers (e.g., the consumer 112, etc.) involved in the different transactions herein are prompted to agree to legal terms associated with their payment accounts, for example, during enrollment in their accounts, etc. In so doing, the consumers may voluntarily agree, for example, to allow merchants, issuers, payment networks, etc., to use data collected during enrollment and/or collected in connection with processing purchase transactions to the payment accounts, subsequently, for one or more of the different purposes described herein.

With continued reference to FIG. 1, as part of accepting/authorizing the purchase transaction, the issuer 108, in this exemplary embodiment, relies on fraud detection services, and in particular, a fraud engine 122. The fraud engine 122 is shown as standalone in FIG. 1 (and is generally located along path A so as to have access to authorization messages, etc.), in which case it may be considered consistent with computing device 200. Alternatively, and as indicated by the dotted lines in FIG. 1, the fraud engine 122 may be incorporated into (or associated with), in whole or in part, the issuer 108 and/or the payment network 106. In one specific embodiment, for example, the fraud engine 122 is incorporated, in part, in the payment network 106 (e.g., to compile a fraud score for the purchase transaction based on the biometric score received in the authorization request 118 for the transaction, etc.) and in part in the issuer 108 (e.g., to determine whether to permit the purchase transaction based on the fraud score, etc.), etc.

The fraud engine 122 is configured to receive the authorization request 118, and in turn, to extract the biometric score therefrom, and to generate a fraud score for the requested purchase transaction. The fraud score is generally based on details associated with the consumer's payment account (e.g., recent transactions, transaction history, etc.), the requested purchase transaction (e.g., purchase amount, etc.), and the location of the transaction, etc. In addition, the fraud score may be based, at least in part, on the biometric score (or, it may be independent therefrom). In various embodiments, the fraud score (as appended to the authorization request 118 by the fraud engine 122, for example) may then be used by the payment network 106 to define other scores (fraud scores or otherwise) for the transaction (based on various other data associated with the transaction and/or the payment account) and/or another biometric-specific score. In various embodiments, the fraud score (as appended to the authorization request by the fraud engine 122, for example) may be used by the issuer 108, upon receipt of the authorization request 118, in combination with other approval conditions (e.g., in connection with approval operations based on available credit/funds, delinquencies, status of the payment account, etc.), to approve or decline the requested transaction. It should be appreciated that the determination to approve the transaction, or not, may be at the issuer 108, as generally described herein, or it may be at the payment network 106 in other embodiments. In any case, based on the approval or decline of the purchase transaction, a reply is transmitted back to the merchant 102, via the acquirer 104, as indicated above.

Transaction data is generated, collected, and stored as part of the above interactions among the merchant 102, the acquirer 104, the payment network 106, the issuer 108, and the consumer 112. The transaction data represents at least a plurality of purchase transactions, for example, authorized transactions, cleared transactions, attempted transactions, etc. The transaction data, in this exemplary embodiment, is stored at least by the payment network 106 (e.g., in a data structure associated with the payment network 106, etc.). Additionally, or alternatively, the merchant 102, the acquirer 104 and/or the issuer 108 may store the transaction data, or part thereof, in a data structure, or transaction data may be transmitted between parts of system 100, as used or needed (e.g., for clearing, etc.). The transaction data may include, for example, primary account numbers (PANs), amounts of the transactions, merchant IDs, merchant category codes (MCCs), dates/times of the transactions, products purchased and related descriptions or identifiers, etc. It should be appreciated that more or less information related to transactions, as part of either authorization, clearing, and/or settling, may be included in transaction data and stored within the system 100, at the merchant 102, the acquirer 104, the payment network 106, and/or the issuer 108.

While only one merchant 102 and one consumer 112 are shown in the system 100 in FIG. 1, it should be appreciated that multiple merchants and/or consumers may be included in the system 100 or as part of other systems in other embodiments. Similarly, while only one acquirer 104, one payment network 106, and one issuer 108 are illustrated, it should be appreciated that any number of these entities (and their associated components) may be included in the system 100, or may be included as a part of systems in other embodiments, consistent with the present disclosure.

Figure 3:
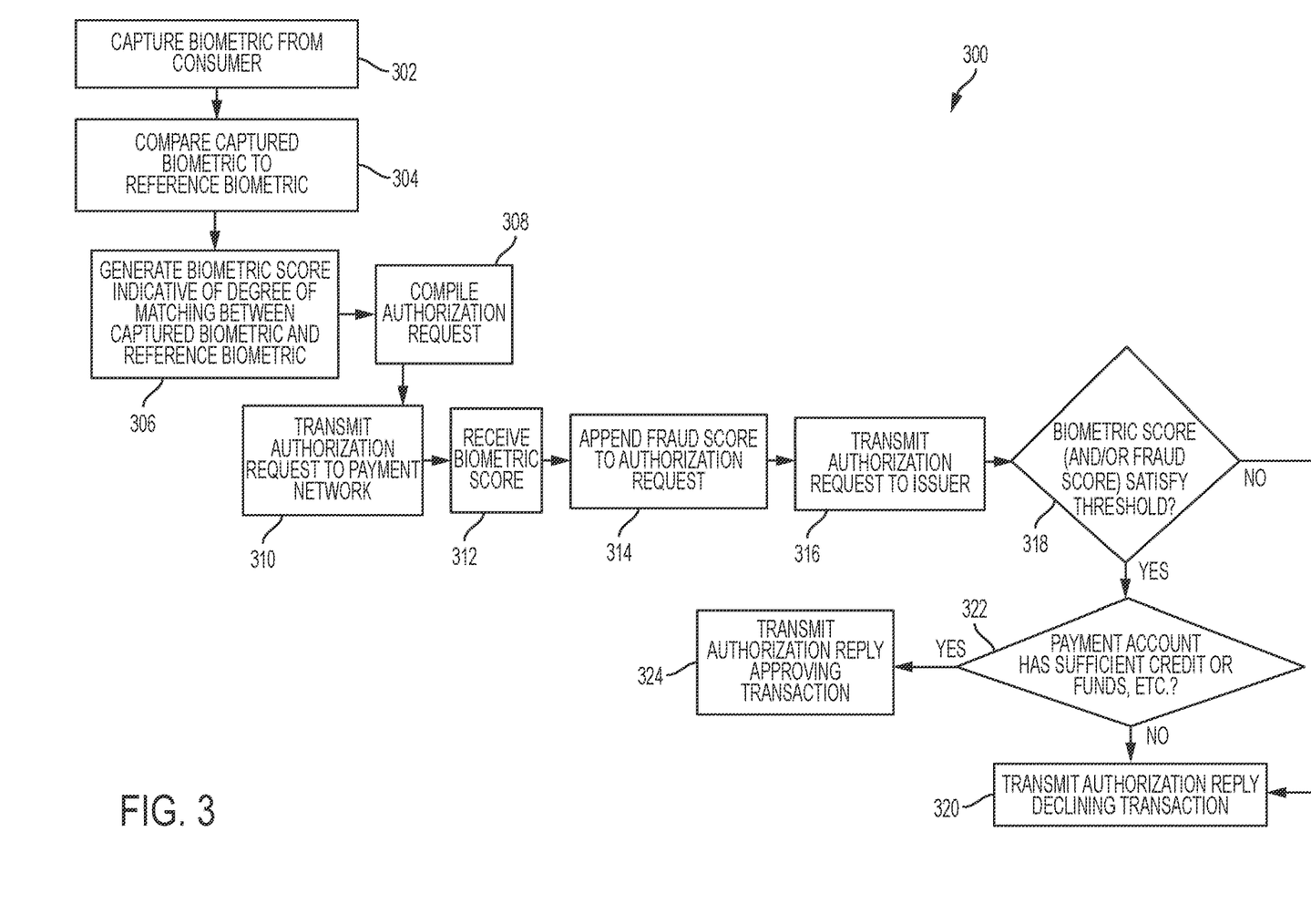
FIG. 3 is an exemplary method that may be implemented in the system of FIG. 1 for use in authenticating a consumer to a payment account and approving, or authorizing, a purchase transaction by the consumer to the payment account based, at least in part, on a biometric score for the consumer associated with the consumer's authentication.

FIG. 3 illustrates an exemplary method 300 for use in authenticating a consumer to a payment account and approving a purchase transaction by the consumer to the payment account based, at least in part, on a biometric score for the consumer associated with authentication of the consumer for the purchase transaction. The exemplary method 300 is described with reference to the system 100 as implemented, in part, in the fraud engine 122 and the POS terminal 114 associated with merchant 102, and with additional reference to the computing device 200. However, the methods herein should not be understood to be limited to the exemplary system 100 or the exemplary computing device 200, and likewise, the systems and the computing devices herein should not be understood to be limited to the exemplary method 300.

In the method 300, when the consumer 112 initiates a transaction to his/her payment account at the merchant 102, the POS terminal 114 and/or the payment device 116 captures, at 302, a biometric associated with the consumer 112, and compares the captured biometric, at 304, to the reference biometric for consumer 112 (e.g., stored at the payment device 116, etc.). For example, when the payment device 116 includes a card-type device, and a fingerprint reader (e.g., as an input device 208, etc.) (or other biometric reader) is also included in the payment device 116, the consumer 112 may insert a portion of the payment device 116 into the POS terminal 114, leaving a portion (including the fingerprint reader) exposed to receive the consumer's fingerprint (or other biometric). The payment device 116 then captures the consumer's fingerprint, and compares it (e.g., a data representation thereof, etc.) to a reference fingerprint stored in the payment device 116 (e.g., in memory 204, etc.). In another example, when the payment device 116 includes a communication device (e.g., a smartphone, a tablet, etc.) including an e-wallet application, the biometric may be captured by the communication device (e.g., by an input device 208 thereof, etc.), and compared to a reference fingerprint stored in the communication device. In still another example, the POS terminal 114 may include a fingerprint reader (or be associated with a fingerprint reader), or other type of biometric reader. Then, when the payment device 116 is inserted in the POS terminal 114 (or otherwise presented to the POS terminal 114), the POS terminal 114 may capture the consumer's fingerprint (or other biometric) and compare it to a reference fingerprint received from the payment device 116, or provides the captured fingerprint to the payment device 116 for comparison.

Generally, the biometric comparison, at 304, is dependent on a type of biometric captured by the POS terminal 114 and/or the payment device 116. For example, when the biometric is a fingerprint, the POS terminal 114 and/or the payment device 116 may employ conventional methodologies to determine a degree of matching between the captured biometric and the reference biometric. Specifically, for example, the methodology may include a correlation-based method, a minutiae-based method, etc. It should be appreciated that suitable methodologies (e.g., algorithms, etc.) known to those skilled in art to compare biometrics may be used.

Next, the POS terminal 114 and/or the payment device 116, based on the comparison of the captured biometric to the reference biometric, generate, at 306, a biometric score indicative of the degree of matching between the two biometrics (and specifically, data representative thereof, etc.). The degree of matching, as a percentage, may then represent the biometric score. For example, if the captured biometric is matched to the reference biometric with 88.5% certainty, the biometric score may be 885. When the biometric score is generated at the payment device 116, it is provided to the POS terminal 114, along with any payment credentials stored in the payment device 116 necessary, or usable, to facilitate the purchase transaction (e.g., the PAN for the payment account, the expiration date of the payment device 116, the CVV of the payment device 116, the consumer's name, etc.). In addition, when the payment device 116 includes an EMV payment device, further information may be provided to (or received from) the POS terminal 114 (e.g., via an EMV chip, etc.) in connection with the purchase transaction related to, for example, cryptograms, etc.

The POS terminal 114 then compiles, at 308, the authorization request 118 for the purchase transaction. In general, the authorization request 118 includes various transaction data for the transaction (e.g., an amount of the transaction, a time/date of the transaction, a product purchased in the transaction, merchant ID, etc.). In addition in the method 300, the authorization request 118 includes the biometric score generated for the transaction (e.g., 885 in the above example, etc.).

For example, the POS terminal 114 may compile the authorization request 118 as an ISO 8583 message (e.g., an ISO 0100 message, an ISO 0200 message, etc.) for the purchase transaction, to be transmitted to the acquirer 104 and payment network 106, etc., to determine if the transaction is to be approved, or not. The ISO 8583 message may include various data elements, which include data related to the requested transaction, including for example, the PAN of the consumer's payment account, the CVV of the consumer's payment device 116, the expiration date of the consumer's payment device 116, the consumer's name, a merchant ID for the merchant 102, an ID for the POS terminal 114, etc. Typically, such transaction data is compiled into the message as defined by the ISO 8583 standard. In addition in this example, the ISO 8583 message includes the biometric score in one of the available data elements of the message. Specifically, for example, the biometric data may be included at data element (DE) 48, or at DE 55. The data element may then include further data regarding the biometric authentication of the consumer 112, including, for example, distinct bytes of data such as: a result of the authentication (e.g., pass, fail, unavailable, etc.), a partner and/or a provider ID used to identify the biometric technology involved and partner/vendor providing such technology, an indication of the underlying biometric authentication method used (e.g., facial scan, fingerprint scan, retina scan, etc.), and the generated biometric score, etc.

It should be apparent that the biometric score may be included in the authorization request 118 in a variety of different manners (e.g., at any desired available data element, sub-element, etc.), and further it may be included in requests generated in accordance with various different types of authorization methods/standards.

Then in the method 300, once the authorization request 118 is compiled by the POS terminal 114, the POS terminal 114 transmits the authorization request 118, at 310, to the payment network 106 (via the acquirer 104), consistent with path A in the system 100 of FIG. 1.

In turn, at 312, the fraud engine 122 receives the authorization request 118, and the biometric score included therewith. In the method 300, the fraud engine 122 is associated with the payment network 106 (e.g., receives the authorization request 118 at the payment network 106, etc.). As such, either the fraud engine 122 (in conjunction with the payment network 106), or the payment network 106 itself, generates various fraud scores relating to the transaction. For example, each fraud score may be based on one or more details associated with the consumer's payment account (e.g., recent transactions, transaction history, etc.), the requested purchase transaction (e.g., purchase amount, etc.), and the location of the transaction, etc. In addition, in the method 300, the fraud score may also be based, at least in part, on the biometric score (or, it may be independent therefrom). The fraud engine 122 then appends the fraud score(s), at 314, to the authorization request 118 (and potentially, other fraud related data).

As an example in the method 300, the fraud engine 122 may append (or compile) the fraud score to (or into) DE 48 of an ISO 8583 message associated with the authorization request 118 (see, FIG. 1). Table 1 illustrates DE 48 for an exemplary ISO 8583 message (e.g., for the authorization request 118 in the method 300), and the various sub-elements and sub-fields included therein. In this example, the biometric score (i.e., 885) is included in the message at Sub-element Z of DE 48. It should be appreciated that the biometric score may be modified and/or otherwise processed, prior to addition to the message, or potentially further modified by the fraud engine 122 as appropriate or desired. In this example, the biometric score is provided on a scale of 0-999, and may be subsequently segregated into three levels by the payment network 106 and/or the issuer 108 and/or the fraud engine 122, for example: high risk scores (001-333), medium risk scores (334-667), and low risk scores (668-999).

TABLE 1

| DE 48 | | | | | | | |
|---|---|---|---|---|---|---|---|
| Sub-element X:<br>On Behalf of Service | | Sub-element Y:<br>Fraud Scoring Data | | | | | Sub-element Z:<br>Biometric Score |
| Subfield 1 | Subfield 2 | Subfield 1 | Subfield 2 | Subfield 3 | Subfield 4 | Subfield 5 | Subfield 1 |
| AA - Fraud Scoring Service Performed | BB - Fraud Scoring Performed Successfully; | [Service score, Services reason code, and/or Service code] | | | | | 885 |

TABLE 1-continued

| DE 48 | | | | | | | |
|---|---|---|---|---|---|---|---|
| Sub-element X: On Behalf of Service | | Sub-element Y: Fraud Scoring Data | | | | | Sub-element Z: Biometric Score |
| Subfield 1 | Subfield 2 | Subfield 1 | Subfield 2 | Subfield 3 | Subfield 4 | Subfield 5 | Subfield 1 |
|  | CC - Fraud Scoring not performed |  |  |  |  |  |  |

In addition to the biometric score in Sub-element Z, the authorization request 118, and in particular DE 48 illustrated in Table 1, further includes an indication of fraud scoring services performed by the fraud engine 122 (at Sub-element X, Subfield 1), and an indication of whether the fraud scoring was performed successfully or not performed (at Sub-element X, Subfield 2). In addition, DE 48 includes particular fraud scoring data in Sub-element Y.

It should be appreciated that, while the biometric score is retained in a separate sub-element of the DE 48 in Table 1 (e.g., as received from the POS terminal 114, etc.), in other embodiments, the biometric score may be appended to DE 48 in other forms (e.g., scaled to account for the particular POS terminal 114 from which the biometric was received, etc.) and/or appended to DE 48 in connection with and/or, potentially, as a basis for the fraud score and/or other scores provided by the payment network 106 to the issuer 108. Further, it should also be appreciated that the biometric score (and the remaining data in DE 48 in Table 1, or other data) may be included at a different DE of an ISO 8583 message, or in an authorization request consistent with one or more different formats, etc.

With continued reference to FIG. 3, the fraud engine 122 next transmits the authorization request 118, at 316, to the issuer 108. In turn, the issuer 108 extracts the biometric score from the authorization request and, at 318, compares the biometric score to a threshold (e.g., based on historical biometric score data, etc.) such as the three different levels provided above. If the biometric score fails to satisfy the threshold (e.g., is a low match or high risk (e.g., a biometric score of 123 per the levels described above, etc.)), then the issuer 108 declines the transaction and transmits, at 320, an authorization reply declining the transaction. Conversely, if the biometric score satisfies the threshold (e.g., is a high match or low risk (e.g., the biometric score is 885 per the levels described above, etc.)), the issuer 108 then, at 322, determines if the transaction and/or payment account satisfies other conventional approval conditions (e.g., available credit/funds, delinquencies, status of the payment account, etc.). If these other conventional conditions are satisfied, the issuer 108 transmits, at 324, an authorization reply approving the transaction. However, if the other conventional conditions are not satisfied, the issuer 108 declines the transaction and transmits, at 320, an authorization reply declining the transaction.

In a variety of embodiments, the issuer 108 also relies on the fraud score, alone, or in combination with the biometrics score, at least in part, to either decline the transaction (at 320) or approve the transaction (at 324). For example, at 318, the issuer 108 may combine the fraud score and the biometric score prior to determining if the threshold is satisfied, or not. Alternatively, the issuer 108, prior to or after comparing the biometric score to the threshold (at 318), or at the same time, may similarly determine if the fraud score satisfies one or more different thresholds (in a separate evaluation from the biometric score). Then, the issuer 108 may only approve the transaction (at 324) if both the biometric score and the fraud score satisfy their corresponding thresholds. It should be appreciated that the issuer 108 may use the fraud score and/or the biometric score in a variety of manners to enhance the detection of fraudulent and/or suspicious transactions. It should also be appreciated that other metrics (or than thresholds) may be used/implemented to evaluate fraud data (e.g., the fraud data may simply include an indicator that a transaction is potentially fraudulent or an indicator that a transaction is safe, etc.).

In the method 300, the fraud engine 122 is generally present at the payment network 106, and performs as described above. In one or more alternative embodiments, the fraud engine 122 may be present at the issuer 108. In such embodiments, the fraud engine 122 receives the biometric score as part of the authorization request 118, at the issuer 108, and compares the biometric score, alone, or in combination with other data (e.g., fraud-related data from the payment network 106, etc.), to one or more thresholds to determine if the transaction should be approved or declined (as being potentially fraudulent and/or suspicious, etc.).

In view of the above, the systems and methods herein provide further data upon which payment networks and/or issuers may make determinations to approve/decline transactions. In particular, rather than relying on the success or failure of biometric authentication alone, the degree of such success and/or matching of the biometric with a reference biometric is further leveraged to provide additional fraud detection and analysis of the purchase transaction. In so doing, a more complete picture of the underlying transaction (and related details) may be provided upon which to determine if the circumstances of the transaction are sufficiently suspicious to decline the transaction, or not.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving a biometric associated with a consumer, when the consumer presents a payment device for funding a transaction with a merchant via a payment account associated with the payment device; (b) appending a biometric score to an authorization request associated with the transaction at the merchant, the biometric score indicative of a degree of match between the received biometric and a reference biometric stored at the payment device; (c) transmitting the authorization request, wherein the biometric score is adapted for an issuer associated with the payment account to utilize the biometric score in determining to approve or decline the transaction; (d) receiving an authorization request for a transaction to a payment account, the authorization request including a biometric score indicating a degree of match between a scanned biometric for a consumer and a reference biometric; and (e) determining based at least in part on the biometric score, to approve or decline the transaction associated with authorization request, whereby an issuer associated with the payment account is able to further rely on authentication of the consumer to indicate a fraudulent and/or suspicions conditions of the transaction.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in processing transactions, based on biometric data used in connection with authenticating consumers to payment accounts to which the transactions are directed, the method comprising:
   in connection with a transaction by a user with a merchant, and the user presenting a biometric-enabled payment device for the transaction to the merchant:
   receiving, by a point-of-sale (POS) terminal computing device of the merchant, from the payment device, a payment account credential specific to a payment account associated with the payment device; and
   receiving, by the POS terminal computing device, from the payment device, a biometric score, which is indicative of a degree of match between i) a biometric of the user captured at the payment device in connection with the user presenting the payment device to the POS terminal computing device and ii) a reference biometric stored in the payment device;
   comparing, by the POS terminal computing device, the biometric score to a threshold;
   determining, by the POS terminal computing device, whether the user is authenticated based on the comparison; and
   in response to the user being authenticated:
   appending, by the POS terminal computing device, the biometric score and an indication of the biometric technology used to capture the biometric, to one or more data elements of an authorization request for the transaction at the merchant, the authorization request including the received payment account credential; and
   transmitting, by the POS terminal computing device, the authorization request, wherein the biometric score and the indication of the biometric technology are adapted for an issuer associated with the payment account to utilize in determining to approve or decline the transaction.

2. The computer-implemented method of claim 1, further comprising appending a pass authentication result to the authorization request, the authentication result based on the degree of match satisfying the threshold.

3. The computer-implemented method of claim 1, further comprising appending an indication of a type of the biometric captured by the payment device to the authorization request; and wherein the type of the captured biometric includes one of a fingerprint, a retina, and a voice.

4. The computer-implemented method of claim 1, wherein the one or more data elements include one of data elements 48 and 55 consistent with the ISO 8583 standard; and wherein transmitting the authorization request includes transmitting the authorization request to an issuer of the payment account, via a payment network.

5. The computer-implemented method of claim 1, further comprising causing the biometric to be captured by a biometric reader included with the payment device.

6. The computer-implemented method of claim 1, further comprising receiving an authorization reply, from an issuer, either approving or declining the transaction based at least in part on the biometric score.

7. A system for use in processing transactions, based on biometric data used in connection with authenticating consumers to payment accounts to which the transactions are directed, the system comprising a point-of-sale (POS) terminal computing device, which is configured to:

in connection with a transaction by a user with a merchant, in which the user presents a biometric-enabled payment device to the POS terminal computing device:
receive, from the payment device, a payment account credential specific to a payment account associated with the payment device; and
receive, from the payment device, a biometric score, which is indicative of a degree of match between i) a biometric of the user captured at the payment device in connection with the user presenting the payment device to the POS terminal computing device and ii) a reference biometric stored in the payment device;
compare the biometric score to a threshold;
determine whether the user is authenticated based on the comparison;
in response to the user being authenticated:
append the biometric score and an indication of the biometric technology used to capture the biometric, to one or more data elements of an authorization request for the transaction at the merchant, the authorization request including the received payment account credential; and
transmit the authorization request, wherein the biometric score is adapted for an issuer associated with the payment account to utilize the biometric score in determining to approve or decline the transaction; and
in response to the user not being authenticated, terminate the transaction between the user and the merchant or receive another biometric score from the payment device.

8. The system of claim 7, wherein the POS terminal computing device is further configured to append a pass authentication result to the authorization request, prior to transmitting the authorization request; and wherein the authentication result is indicative of the degree of match satisfying the threshold.

9. The system of claim 7, wherein the POS terminal computing device is further configured to append an indication of a type of the biometric captured by the payment device to the authorization request.

10. The system of claim 9, wherein the type of the captured biometric includes a fingerprint.

11. The system of claim 10, wherein the one or more data elements include one or more data elements defined in the ISO 8583 standard.

12. The system of claim 11, wherein the POS terminal computing device is configured to transmit the authorization request to an issuer of the payment account, via a payment network.

13. The system of claim 7, further comprising the payment device, which is configured to:
capture the biometric from the user;
generate the biometric score based on a comparison of the captured biometric and the reference biometric; and
transmit the biometric score, along with the payment account credential, to the POS terminal computing device, as part of presentment to the POS terminal computing device in connection with the transaction.

14. The system of claim 13, wherein the payment device is a payment card device.

15. A non-transitory computer readable storage media including computer executable instructions, which when executed by at least one processor of a point-of-sale (POS) terminal computing device, cause the at least one processor to:

in connection with a transaction by a user with a merchant, in which the user presents a biometric-enabled payment device for the transaction to the POS terminal computing device,
receive, from the payment device, a payment account credential specific to a payment account associated with the payment device; and
receive, from the payment device, a biometric score, which is indicative of a degree of match between i) a biometric of the user captured at the payment device in connection with the user presenting the payment device to the POS terminal computing device and ii) a reference biometric stored in the payment device;
compare the biometric score and a threshold;
determine whether the user is authenticated based on the comparison;
in response to the user being authenticated:
append the biometric score and an indication of the biometric technology used to capture the biometric, to one or more data elements of an authorization request for the transaction at the merchant, the authorization request including the received payment account credential; and
transmit the authorization request, wherein the biometric score is adapted for an issuer associated with the payment account to utilize the biometric score in determining to approve or decline the transaction; and
in response to the user not being authenticated, terminate the transaction between the user and the merchant or receive another biometric score from the payment device.

16. The non-transitory computer readable storage media of claim 15, wherein the instruction, when executed by the at least one processor, further cause the at least one processor to append at least one of a type of the captured biometric, an authentication result and/or an identifier of biometric technology used in capturing the biometric.

17. The non-transitory computer readable storage media of claim 15, wherein the instruction, when executed by the at least one processor, cause the at least one processor to transmit the authorization request to an issuer of the payment account, via a payment network, only when the user is authenticated.

\* \* \* \* \*